UNITED STATES PATENT OFFICE.

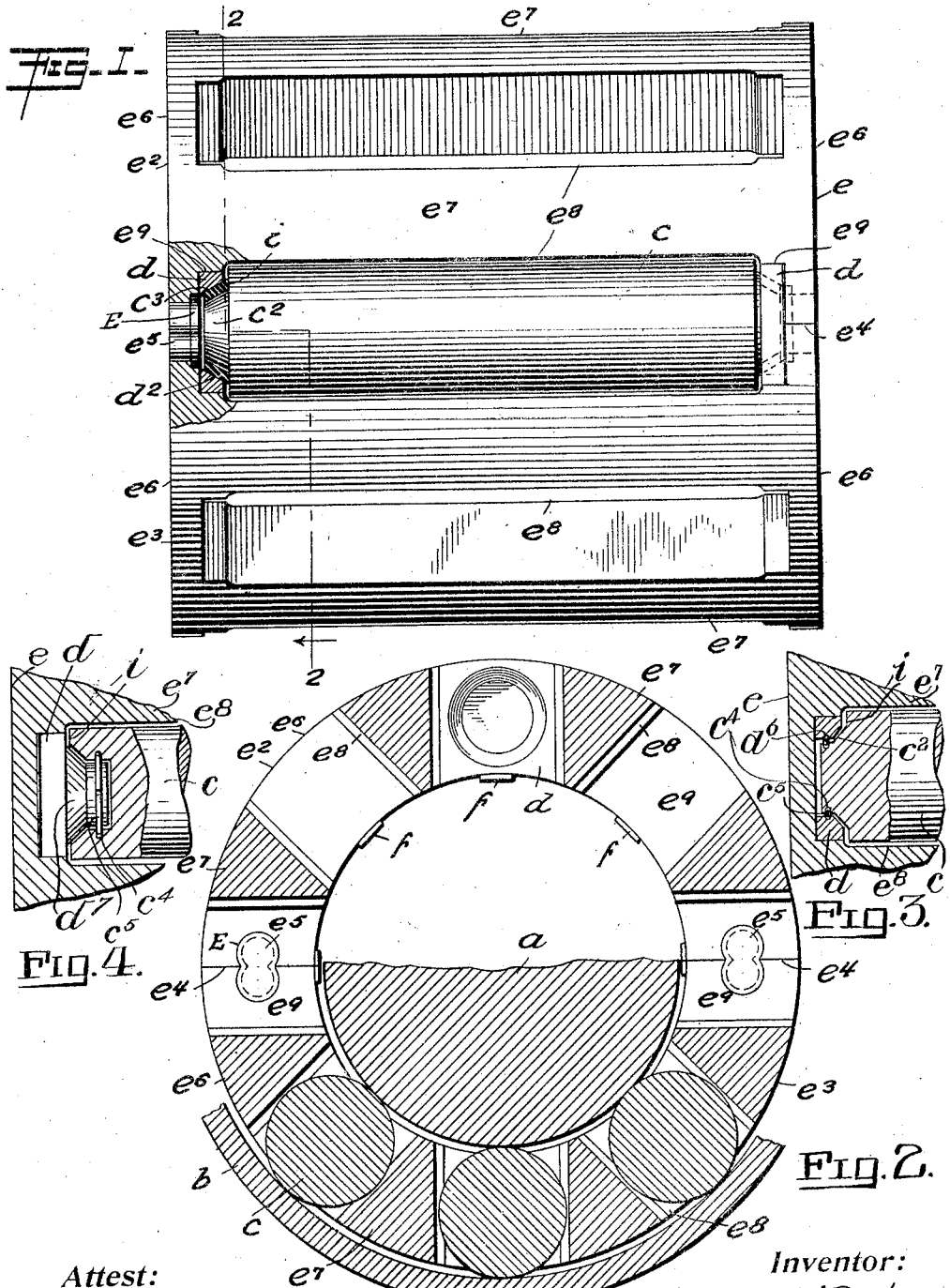

JULIUS A. PERKINS, OF OMAHA, NEBRASKA.

ROLLER-BEARING.

1,002,439.

Specification of Letters Patent. Patented Sept. 5, 1911.

Application filed October 28, 1908. Serial No. 459,815.

*To all whom it may concern:*

Be it known that I, JULIUS A. PERKINS, a citizen of the United States of America, and residing at Omaha, in the county of Douglas and State of Nebraska, have invented certain new and useful Improvements in Roller-Bearings, of which the following is a specification, such as will enable those skilled in the art to which it appertains to make and use the same.

This invention relates to anti-friction bearings for the journals of axles, shafts, and the like, with particular reference to roller bearings, and is an improvement over the form of construction shown and described in United States Patent, No. 664,822, issued to me on the 25th day of December, 1900.

One object of the present invention is to provide solid rollers, instead of hollow ones provided with spindles, thereby increasing the strength of the bearings and decreasing the space occupied thereby.

Another object is to provide means whereby the rollers may move radially of the journal axis, at either end thereof.

Another object is to provide a carrier or cage which maintains the rollers in corresponding axial planes of the said journal.

Another object is to provide bearing blocks at the ends of the rollers for supporting and guiding the said rollers in their planetary movement, said bearing blocks being attached to and portable with the rollers.

Another object is to provide a separable cage which can be assembled in the operative position on the journal.

Another object is to provide locking means for the cage members which prevent movement thereof, one upon the other, when my roller bearing is assembled; and still another object is to provide means whereby the cage is always held in a position concentric with the journal.

My invention is fully described in the following specification, of which the accompanying drawings form a part, in which the separate parts are designated by the same reference characters in each of the views, and in which:—

Figure 1 is a side elevation of the cage which I employ, showing one roller in position, and partly in section; Fig. 2 is a section taken on the line 2—2 of Fig. 1, with a fragmentary showing of the journal and raceway for the rollers, and a lock for the cage members; Fig. 3 is a fragmentary, sectional, view of one of the roller ends provided with my self-contained bearing-block; and Fig. 4 is a similar view of a modification of the construction shown in Fig. 3.

In the drawings forming a part of this application, I have shown a portion of the journal $a$ of an axle, shaft, or the like, and at $b$ is shown a portion of the roller raceway, between which, and said journal, are mounted a plurality of cylindrical bar sections, forming solid rollers $c$, the ends of which are mounted in bearing blocks $d$, carried by a cage $e$.

In the form of construction shown in Figs. 1 and 2 I provide the said rollers with tapered journals $c^2$ which are inserted into correspondingly recessed anti-friction rings $c^3$, similarly tapered to fit into tapered recesses in the blocks $d$, as shown at $d^2$.

The cage $e$ is preferably composed of two segmental members $e^2$ and $e^3$, joined at $e^4$, in the axial plane of the journal, by means of a locking plate $e^5$, which consists of two members of greater width than at the intersection thereof, the members $e^2$ and $e^3$ being provided with similarly shaped recesses which register with each other. Each of the cage members $e^2$ and $e^3$ consists of a semi-annular plate $e^6$ at each end of the cage, joined by means of ribs or cross bars $e^7$, either integral therewith or connected thereto in any desired manner, these ribs being equidistant from each other and forming roller spaces $e^8$, and at the ends of the said spaces, in the plates $e^6$, are radial block guiding recesses $e^9$, which are of less transverse diameter than the roller spaces, whereby parallel shoulders are formed, as clearly shown.

As shown in Fig. 2, I provide one edge of the plates $e^6$ with a stop $f$, in the position of each of the guiding recesses $e^9$ and which serve to limit the movement of the bearing blocks $d$, thus maintaining the cage in a position concentric with the journal $a$, when the bearing is assembled.

In assembling my roller bearing, I place the rollers in position in each cage member separately, omitting the two rollers in the positions of the joints $e^4$, the latter being placed in position after the said members have been joined by the lock therefor and, when these last named rollers are placed in position, it will be seen that lateral movement of the cage members is prevented and a positive lock results.

It will thus be seen that I provide a roller bearing employing solid rollers, and permit movement thereof radially of the journal, it being understood that the bearing blocks are freely, but not loosely, movable in their guiding recesses, thus insuring the automatic adjustment of the rollers to imperfections and irregularities in the journal $a$, and I also provide a roller bearing cage which, while composed of separable members, is readily assembled and the members thereof positively locked against individual movement.

The locking plate $e^5$, shown in Figs. 1 and 2, is preferably provided with a flange E resting in a correspondingly shaped recess in the members $e^2$ and $e^3$, being thus prevented from falling or from being forced out when the cage is assembled with the rollers therein, the said plates being placed in position from within the cage members, as clearly shown.

In Fig. 3 of the drawings I have shown one form of bearing block attachment wherein the block $d$ is provided with a groove $d^6$, and the journal $c^2$ with a groove $c^4$, both of which grooves, jointly, engage a ring $c^5$ therebetween, thus forming a flexible, detachable, connection which permits rotation of the journal within the block.

In Fig. 4 I have shown a modification of the construction just described in that I mount a boss $d^7$ upon the block $d$, said boss extending into a corresponding recess in the roller end, the attaching means being similar to those last described, but it will be apparent that many other methods for attaching the blocks to the rollers may be designed and be equally as operative, this bearing block construction being applicable to bearings designed for use in heavy machinery and the like, wherein the rollers are supported by the said bearing blocks, as well as guided in their planetary movement.

Having fully described my invention, what I claim as new and desire to secure by Letters Patent, is:—

1. In a journal bearing, a cage comprising separable, segmental, members, means for locking said members against transverse separation, rollers carried by said cage, and bearing blocks interposed between said rollers and said cage, and blocks and rollers preventing lateral separation of said members.

2. A cage, for use in roller bearings, comprising separable, segmental, members, means for locking said members against transverse separation, rollers carried by said cage, bearing blocks interposed between said rollers and said cage, said blocks and rollers preventing longitudinal separation of said members, and anti-friction rings interposed between said blocks and rollers.

3. A cage, for use in roller bearings, comprising separable, segmental, members, means for locking said members against transverse separation, rollers carried by said cage and provided with tapered journals, bearing blocks for said rollers carried by said cage, and tapered rings of anti-friction material mounted upon said journals and in said bearing blocks, said rollers, blocks, and rings preventing longitudinal separation of said members.

4. As an article of manufacture, for use in a bearing, a roller having a bearing block attached to each end and forming a component part thereof and portable therewith.

5. As an article of manufacture, for use in a bearing, a roller having a bearing block rotatably attached to each end thereof and forming a component part thereof and portable therewith.

6. As an article of manufacture, for use in a bearing, a roller having a bearing block flexibly attached to each end and forming a component part thereof and portable therewith.

7. As an article of manufacture, for use in a bearing, a roller having a bearing block rotatably and flexibly attached to each end and forming a component part thereof and portable therewith.

8. As an article of manufacture, for use in a bearing, a roller provided with reduced journals at its ends, and a bearing block attached to each of said journals, said bearing blocks forming a component part of said roller and portable therewith.

9. As an article of manufacture, for use in a bearing, a roller provided with reduced journals at its ends, and a bearing block rotatably attached to each of said journals, said bearing blocks forming a component part of said roller and portable therewith.

10. As an article of manufacture, for use in a bearing, a roller provided with reduced journals at its ends, and a bearing block flexibly attached to each of said journals, said bearing blocks forming a component part of said roller and portable therewith.

11. As an article of manufacture, for use in a bearing, a roller provided with reduced journals at its ends, and a bearing block rotatably and flexibly attached to each of said journals, said bearing blocks forming a component part of said roller and portable therewith.

12. As an article of manufacture, for use in a bearing, a roller provided with reduced journals, a bearing block mounted upon each of said journals, and means for attaching said blocks to said journals against dislodgment, said bearing blocks thus forming a component part of said roller and portable therewith.

In testimony that I claim the foregoing as my invention I have signed my name in presence of the subscribing witnesses this 27th day of October 1908.

JULIUS A. PERKINS.

Witnesses:
GEORGE E. MINER,
J. C. LARSEN.